Patented Mar. 26, 1935

1,996,008

UNITED STATES PATENT OFFICE 1,996,008

PROCESS FOR IMPROVING HYDROCARBONS

Hans Kaehler, Oppau, and Hans Klein, Mannheim, Germany, assignors to Standard-I. G. Company, Linden, N. J., a corporation of Delaware No Drawing. Application June 23, 1931, Serial No. 546,424. In Germany June 30, 1930

5 Claims. (Cl. 196—24)

The present invention relates to a process for improving hydrocarbons.

It has already been proposed to improve hydrocarbons which are solid or liquid at ordinary room temperatures, such as petroleums, tars and the like and their distillation products, especially by desulphurizing and hydrogenating them, by treating them with hydrogen in the presence of a metal oxide or hydroxide. These processes are usually carried out at temperatures ranging from about 200° to 475° C., preferably between 300° and 410° C., and at pressures between 30 and 200 atmospheres, but also higher or lower pressures may be employed. The conditions of temperature and pressure and, if desired, also of duration of treatment, are however, to be selected so mild that no substantial cracking of the treated hydrocarbons occurs. These conditions depend on the nature of the initial materials. For example with paraffin wax cracking sets in at comparatively lower temperatures, i. e., at between 370° and 380° C., than with a Panuco oil fraction boiling between 250° and 350° C., which is cracked at temperatures above about 440° C. Therefore with each particular material a temperature should be maintained which is below the temperature limited at which substantial cracking sets in.

We have now found that a far reaching and rapid desulphurization of the said materials, if desired together with a simultaneous hydrogenation, is effected by carrying out the treatment with hydrogen or gases containing or supplying hydrogen in the presence of iron which has been activated with cobalt or nickel or both. The amount of nickel or cobalt added to the iron may be very small; amounts of from 0.25 to 1 per cent calculated with reference to the iron employed are usually sufficient. Preferably not more than 10 percent of the activating metal or metals with reference to the amount of iron are employed. The catalyst may be prepared very simply. For example iron oxide powder may be impregnated with the appropriate amount of a solution of nickel nitrate, the mass then being evaporated and dried. It is not essential to reduce the mass before its employment. Or the solutions of an iron salt and of a nickel salt or cobalt salt are mixed in the desired proportions, a mixture of the hydroxides or carbonates then being precipitated by means of suitable agents. The precipitate is then washed and dried. Any other method known for preparing activated catalysts may be employed in the present case.

The activated iron acts as an agent for combining with sulphur and also as a hydrogenating catalyst. Contrary to expectation, the activating action of the small amounts of nickel or cobalt employed is not appreciably influenced by the sulphur content of the materials to be treated. The amount of catalyst to be employed depends on the sulphur content of the initial materials. Thus for example in the case of a sulphur content of from 0.5 to 1 per cent by weight, 2 per cent by weight of catalyst, calculated with reference to the initial material to be desulphurized, is sufficient. The temperature and duration of the treatment depend on the kind of material to be desulphurized. Generally speaking the temperature is from 200° to 475° C. and the duration of heating, which is the shorter the higher the temperature, is from ½ to 4 hours in the case of paraffin wax, crude petroleums, gas oils and the like. The temperature and the duration of the treatment may be considerably reduced by stirring. The sulphur is practically completely combined with the catalyst. No sulphur passes out with the reaction gases, so that the excess of hydrogen may be employed again without special purification.

The reaction product is preferably worked up by separating it from the catalyst by filtration, centrifuging or the like. Any small amounts of oil or the like adhering to the catalyst may be recovered by distillation, effected, for example, by means of steam, or by extraction. In order to carry out the extraction in a simple manner it is advantageous to employ low-boiling extraction agents which render it possible to effect the subsequent separation of extraction agent and extracted product by distillation in a simple manner.

The iron is employed in the metallic form, under which expression we understand also oxides of iron or such compounds as furnish oxides of iron when heated, such as hydroxides or carbonates, since the said oxides under the reaction conditions are reduced to metallic iron.

The catalysts according to the present invention have the advantage that by reason of their good activity lower temperatures may be employed than are necessary when employing iron oxide alone. Thus for example with the catalysts according to the present invention crude paraffin wax may be more satisfactorily desulphurized at 330° C. than with a not activated iron catalyst at 350° C., in the same period of time. Furthermore, even oils containing large amounts of sulphur may be readily purified; for example a Panuco oil having a sulphur content of 2.4 per cent may be brought to a sulphur content of 0.1 per cent by a single treatment.

The following examples will further illustrate the nature of this invention, but the invention is not restricted to these examples. The parts are by weight.

Example 1

1 part of a solution of nickel nitrate containing 0.5 per cent of nickel is added to 1 part of iron oxide and the mass is evaporated to dryness. 100 parts of brown colored crude paraffin wax having a sulphur content of 0.45 per cent, an iodine value of 13.8 and a melting point of 58° C. are heated with 4 parts of the said catalyst in an autoclave under a pressure of 100 atmospheres of hydrogen at 340° C. for 2 hours. 99.4 parts of white paraffin wax having a sulphur content of 0.02 per cent, an iodine value of 0.378 and a melting point of 58° C. are obtained. The paraffin wax is so pure that it may be used directly for example for catalytic oxidation with gases containing oxygen.

Example 2

200 parts of American gas oil having a sulphur content of 0.24 per cent are heated for 4 hours with an initial pressure of hydrogen of 100 atmospheres at 400° C. in a stirring autoclave with 8 parts of an iron catalyst activated with cobalt which has been prepared in a manner similar to that described in Example 1 and which contains 0.25 per cent of cobalt. A pale oil having a sulphur content of 0.0053 per cent is obtained as the reaction product. When employing iron alone, the sulphur content amounts to 0.016 per cent, that is three times as much.

What we claim is:

1. A process for purifying a sulfur-containing hydrocarbon mixture such as an oil, tar, or wax which is solid or liquid at ordinary room temperature, which comprises treating said mixture with a gas comprising hydrogen at a temperature between 200° and 475° C. under an elevated pressure and in the presence of metallic iron mixed with a sufficient amount of at least one of the metals nickel and cobalt to activate the iron but not exceeding ten per cent by weight of the iron while regulating the conditions of working so that no substantial cracking of said hydrocarbon mixture occurs.

2. A process according to the preceding claim in which the pressure is between 30 and 200 atmospheres.

3. A process for purifying crude paraffin wax containing sulfur, which comprises treating said wax with hydrogen at a temperature of about 340° C. under a pressure of about 100 atmospheres in the presence of a body prepared by mixing iron oxide with a solution of nickel nitrate containing nickel in amounts up to 10 per cent of the weight of the iron and evaporating the mass to dryness.

4. A process for purifying American gas oil containing sulfur, which comprises treating said oil with hydrogen at a temperature of about 400° C. under a pressure of about 100 atmospheres and in the presence of a body prepared by mixing iron oxide with a solution of cobalt nitrate containing cobalt in amounts up to 10 per cent of the iron and evaporating the mass to dryness.

5. A process according to claim 1 in which the temperature is between 300° and 410° C. and the pressure is between 30 and 200 atmospheres.

HANS KAEHLER.
HANS KLEIN.